Aug. 19, 1969     H. ZIEGLER     3,461,726
APPARATUS FOR MEASURING A DIFFERENCE IN PRESSURE
Filed Nov. 6, 1967
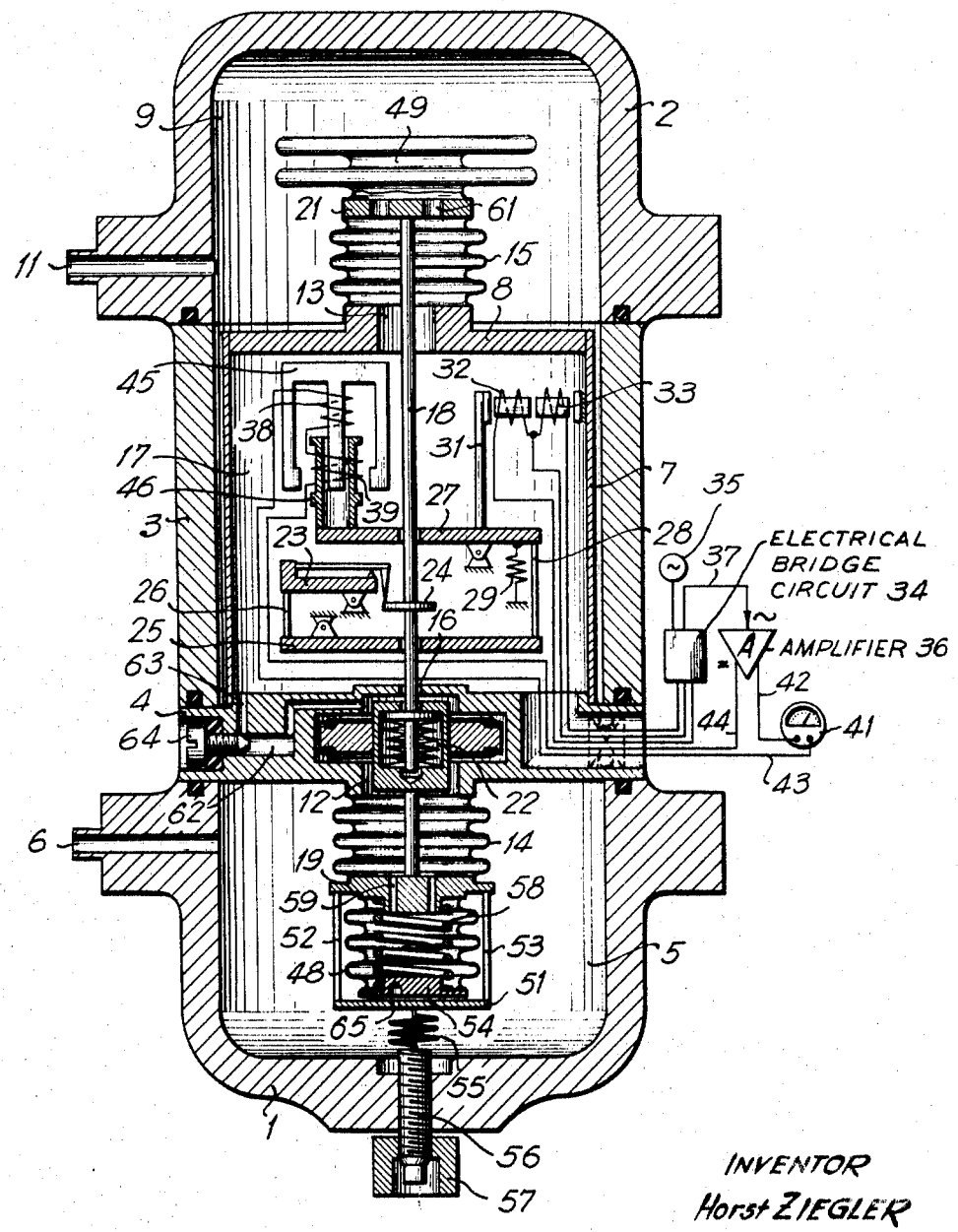
INVENTOR
Horst ZIEGLER

3,461,726
APPARATUS FOR MEASURING A DIFFERENCE IN PRESSURE

Horst Ziegler, Berlin, Germany, assignor to Continental Elektroindustrie AG Askania-Werke, Berlin-Mariendorf, Germany, a corporation of Germany
Filed Nov. 6, 1967, Ser. No. 680,723
Claims priority, application Germany, Nov. 8, 1966, C 40,615
Int. Cl. G01l 9/00
U.S. Cl. 73—398     10 Claims

ABSTRACT OF THE DISCLOSURE

First and second pressure chambers are coupled to a pipe conducting a medium whose difference in pressure is to be measured. A partition is interposed between the first and second pressure chambers and has an aperture formed therethrough. A first expandable elastic container in the first pressure chamber seals said pressure chamber at the aperture and a second expandable elastic container in the second pressure chamber seals said chamber at the aperture. A linking rod is affixed to each of, and rigidly couples, the first and second elastic containers and extends therebetween through the aperture. The linking rod is mechanically coupled to an electromechanical compensating system for providing an electrical signal corresponding to a difference in pressure between the first and second pressure chambers. A first expandable elastic expansion container is affixed to and opens into the first elastic container. A second expandable elastic expansion container is affixed to and opens into the second elastic container. Each of the first and second expansion containers and elastic containers is filled with liquid, the volume of liquid in the first expansion container being variable under variation in pressure in the first pressure chamber. A liquid passage is formed through the partition and extends from and opens into each of the first and second elastic containers and throttles the flow of liquid therebetween.

DECRIPTION OF THE INVENTION

The present invention relates to apparatus for measuring a difference in pressure. More particularly, the invention relates to electromechanical apparatus for measuring a difference in pressure in a medium such as, for example liquid in a pipe.

In known types of electromechanical apparatus for measuring a difference in pressure it is difficult to provide adequate damping. This may be attributed to the fact that the movable components of the apparatus move to only a small extent during operation of such apparatus. Such apparatus is therefore dampened by electrical means. A capacitor may be connected in parallel with the electrical output terminals of such apparatus and may produce a centering of the output current of such apparatus. Conventional methods for effecting damping are, however, insufficient with regard to time. Furthermore, when the difference in pressure pulsates due, for example, to dampened flow of the medium or due to vibrations of the medium in the pipe, the indicated measurement value of such difference in pressure may be erroneous.

The principal object of the present invention is to provide new and improved apparatus for measuring a difference in pressure. The apparatus of the present invention measures and indicates a difference in pressure with accuracy, efficiency, effectiveness and reliability. The apparatus of the present invention utilizes simple structure.

In accordance with the present invention, apparatus for measuring a difference in pressure comprises a first pressure chamber having a conduit for coupling to a pipe conducting a medium whose difference in pressure is to be measured. A second pressure chamber has a conduit for coupling to the pipe. A partition arrangement is imposed between and separates the first and second pressure chambers and has an aperture therethrough. A first expandable elastic container in the first pressure chamber seals the first pressure chamber at the aperture through the partition arrangement. A second expandable elastic container in the second pressure chamber seals the second pressure chamber at the aperture through the partition arrangement. A linking rod is linked to each of, and rigidly couples, the first and second elastic containers and extends from one of the elastic containers to the other through the aperture through the partition arrangement. An electromechanical power compensating arrangement provides an electrical signal corresponding to a difference in pressure between the first and second pressure chambers. The linking rod is mechanically coupled to the electromechanical power compensating arrangement. More specifically, in accordance with the present invention, a first expandable elastic expansion container is affixed to and opens into the first elastic container. A second expandable elastic expansion container is affixed to and opens into the second elastic container. Each of the first and second expansion containers and therefore each of the first and second elastic containers is filled with liquid, the volume of liquid in the first expansion container is variable under variation in pressure in the first pressure chamber.

A liquid passage is formed through the partition arrangement and extends from, and opens into, each of the first and second elastic containers for directing the passage of liquid from the first elastic container to the second elastic container and for throttling the flow of liquid between the first and second elastic containers.

The partition arrangement comprises a first partition having a first aperture formed therethrough and a second partition spaced from the first partition and having a second aperture formed therethrough. The first partition separates the first pressure chamber from a third pressure chamber and the first elastic container seals the first pressure chamber at the first aperture. The second partition separates the second and third pressure chambers and the second elastic container seals the second pressure chamber at the second aperture. The liquid passage is formed through the first partition and extends from and opens into each of the first elastic container and the third pressure chamber and directs the passage of liquid from the first elastic container to the second elastic container via the third pressure chamber. The liquid passage throttles the flow between the first elastic container and the third pressure chamber. A flow control device is provided in the liquid passage for varying the cross-sectional area of the liquid passage and has an extending portion for manual control thereof. The third pressure chamber is filled with liquid.

The first, second and third pressure chambers are preferably axially aligned with the first and second elastic containers and the first and second expansion containers are preferably coaxially positioned with the chambers and each other. The linking rod preferably extends coaxially through the third pressure chamber.

In order that the invention may be readily carried into effect, it will now be described with reference to the accompanying drawing, wherein the single figure is a view partly in section of an embodiment of the apparatus of the present invention for measuring a difference in pressure. Components such as, for example, sealing device and the like, which are not necessary for an understanding of the invention are not shown in the figure in order to maintain clarity of illustration.

In the figure, a first cap of closed substantially cylindrical configuration open at one end is provided in axial alignment with a second cap of closed substantially cylindrical configuration open at one end facing the open end of said first cap. A cylindrical portion 3 is disposed between the open ends of the first and second caps 1 and 2. The cylindrical portion 3 is open at both ends and therefore provides a conduit between the first and second caps 1 and 2. The three housing sections 1, 2, 3 are in coaxial alignment with each other and are affixed to each other by any suitable means such as, for example bolts or welds.

A first partition 4, of substantially disc-like configuration, is positioned substantially perpendicularly to the axis of the housing sections 1, 2 and 3. The partition 4 is clamped or otherwise suitably affixed between the first cap section 1 and the cylindrical section 3. The first housing section 1 and the partition 4 form a first pressure chamber 5. The first pressure chamber 5 has a conduit 6 which couples said first pressure chamber to a pipe (not shown in the figure), which conducts a medium such as, for example, a liquid whose difference in pressure is to be measured.

A cylindrical container 7 is coaxially positioned in the cylindrical housing section 3. The cylindrical container 7 is open at both ends and is affixed at its lower open end to the partition 4. The upper end of the cylindrical container 7 is closed by a second partition 8. The second partition 8 is positioned between the second housing section 2 and the cylindrical housing section 3 and is substantially perpendicular to the axis of the housing sections 1, 2 and 3. The second housing section 2 and the second partition 8 form a second pressure chamber 9. The second pressure chamber 9 has a conduit 11, which couples said second pressure chamber with the pipe (not shown in the figure) which conducts the medium.

The first partition 4 separates the first and second pressure chambers 5 and 9 from each other. The first partition 4 has a first axial aperture 12 formed therethrough. The second partition 8 has a second axial aperture 13 formed therethrough. The conduits 6 and 11 from the first and second pressure chambers 5 and 9, respectively, lead into the pipe (not shown in the figure), conducting the medium at spaced points in said pipe, and a restricting or constraining device may be connected into the pipe or said conduits. The restricting or constraining device is utilized to facilitate the measurement of a difference in pressure in the medium or liquid flowing through the pipe. Since the difference in pressure of the medium flowing through the pipe is indicative of the flow of the medium through the pipe, said flow is also measured and indicated by the apparatus of the present invention.

A first expandable elastic container 14 in the first pressure chamber 5 seals said first pressure chamber at the first aperture 12 through the first partition 4 by completely covering said first aperture. A second expandable elastic container 15 in the second pressure chamber 9 seals said second pressure chamber at the second aperture 13 through the second partition 8 by completely covering said second aperture. Each of the first and second expandable elastic containers 14 and 15 is of bellows, corrugated, accordion and the like type, so that it is freely expandable under variations in pressure. Each of the first and second expandable elastic containers 14 and 15 may comprise a diaphragm.

An axial bore 16 is formed through the first partition 4. The inside of the first elastic container 14 is provided with a passage to the inside of the second elastic container 15 by the first aperture 12, the bore 16, the cylindrical container 7 and the second aperture 13. The cylindrical container 7 and the first and second partitions 4 and 8, respectively, form a third pressure chamber 17, which is thus separated from the first pressure chamber 5 by said first partition and is separated from the second pressure chamber 9 by said second partition.

A linking rod 18 is affixed at its lower end to the first elastic container 14 via a first cover plate 19 and is affixed at its upper end to the second elastic container 15 via a second cover plate 21. The linking rod rigidly couples the first and second elastic containers 14 and 15 to each other and extends through the first and second aperture 12 and 13, as well as through the bore 16. The bore 16 is provided to accommodate the linking rod 18 and thus has a diameter which is barely large enough to permit free axial movement of said linking rod therethrough.

An excess pressure safety device 22 is provided in the first aperture 12 of the first partition 4. The safety device 22 is operated by the linking rod 18 and may comprise any suitable safety valve of known type which has suitable sealing members in operative proximity with the first aperture 12 and the bore 16. The safety device 22 functions to seal the first aperture 12 and therefore the bore 16 when the pressure in one of the first and second pressure chambers 5 and 9, respectively, exceeds a determined level. Each of the first and second elastic containers 14 and 15, as well as the third pressure chamber 17, is filled with a liquid which is essentially noncompressible. A suitable liquid may comprise, for example, a silicon oil.

An electromechanical power compensating apparatus is positioned and suitably mounted in the third pressure chamber 17. The electromechanical power compensating apparatus is mechanically coupled to the linking rod 18. The electromechanical power compensating apparatus provides an electrical indication of a difference in pressure between the first and second pressure chambers 5 and 9 which corresponds to a difference in pressure in the medium in the pipe (not shown in the figure). The electromechanical power compensating apparatus and the mechanical coupling between the linking rod 18 and said apparatus comprise a plurality of levers and connecting members.

In the electromechanical power compensating apparatus, a first two-arm lever 23 is pivotally mounted in operative proximity with a collar or ring 24 coaxially affixed to the linking rod 18. A second two-arm lever 25 is pivotally mounted in proximity with the first lever 23 and is loosely coupled to said first lever via a first coupling member 26. A third two-arm lever 27 is pivotally mounted in proximity with the first and second levers 23 and 25 and is loosely coupled to the second lever 25 via a second coupling member 28. A tension spring 29 is affixed at one end to the third lever 27 and at the other end to the cylindrical container 7 in a manner whereby said spring provides a tension force on said lever.

Each of the second and third levers 25 and 27 is so positioned that it does not interfere with the free axial movement of the linking rod 18. Thus, for example, such levers may be positioned in a manner whereby they are entirely removed from the path of movement of the linking rod 18. If, however, the second and third levers 25 and 27 are centered with regard to the axis of the housing sections 1, 2 and 3, each of said levers has an aperture formed therethrough having a diameter which is large enough to permit free pivotal movement of said levers without affecting free axial movement of the linking rod 18, which then passes through said apertures. The first and second coupling members 26 and 28 function to impart movement of the first lever 23 to the second lever 25 and from the second lever 25 to the third lever 27, respectively.

One end of the first lever 23 supports a projection which is so positioned that upward movement of the linking rod 18 in an axial direction causes the collar 24 on said linking rod to contact said projection and move said lever in a counterclockwise direction. The first coupling member 26 couples the other end of the first lever 23 to one end of the second lever 25 in a manner whereby counterclockwise movement of said first lever causes counterclockwise movement of said second lever. The other end of the second lever 25 is coupled to one end of the third lever 27 by the second coupling member 28 in such a manner that counterclockwise movement of said second lever causes counterclockwise movement of said third lever.

A metal damping arm 31 is mounted on the third lever 27 and has a free end in operative proximity with a pair of inductive resistors 32 and 33. The inductive resistors 32 and 33 are mounted by any suitable means in the cylindrical container 7 and are connected in an electrical bridge circuit 34 of any suitable known type. The dampening arm 31 thus enables the third lever 27 to function as a measuring element of the electromechanical power compensating apparatus. The electric bridge circuit 34 is energized by a high frequency AC voltage provided by any suitable AC source 35 and is connected to the input of an amplifier 36 via a lead 37. An amplifier 36 may comprise any suitable known amplifier. The bridge circuit 34 functions in a known manner to produce an unbalance or error voltage which is proportional to the position of the third lever 27. The error voltage is amplified in the amplifier 36.

The amplifier 36 includes any suitable AC to DC converter or rectifier, so that the output of said amplifier is a DC signal proportional to the error voltage or unbalance voltage of the bridge circuit 34. The DC error signal provided by the amplifier 36 is supplied to two coils 38 and 39 of an electro-dynamic moving coil system via a meter 41 and leads 42, 43 and 44. The coil 38 is wound about an arm of the core of an electromagnet 45 which is suitably affixed in the cylindrical container 7. The coil 38 thus energizes the electromagnet 45. The coil 39 is wound about a suitable core 46 which is affixed to the other end of the third lever 27. The coil 39 is thus movable with the pivotal movement of the third lever 37 in the air gap of the electromagnet 45.

In accordance with the present invention, a first expandable elastic expansion container 48 is affixed to and opens into the first elastic container 14, and a second expandable elastic expansion container 49 is affixed to and opens into the second elastic container 15. Each of the first and second expansion containers 48 and 49 is affixed to the corresponding elastic container 14 and 15 by any suitable means. Thus, for example, the first expansion container 48 is affixed to the first elastic container 14 via a support plate 51 which is supported by the first cover plate 19 of said first elastic container by support members 52 and 53, for example. The second expansion container 49 is directly affixed to the second cover plate 21 of the second elastic container 15. Each of the first and second expansion containers 48 and 49 is of about the same general structure and functions in the same general manner as the elastic containers 14 and 15.

The first expansion container 48 has a cover plate 54 at its end adjacent the support plate 51. A spring 55 is affixed at one end to the bottom of the support plate 51 and at the other end abuts a threaded member 56 which extends to the outside of the first cap 1. The threaded member 56 is threadedly engaged with an internally threaded bore formed in the first cap 1 and has a suitable head 57 outside said first cap to enable manual control thereof, thereby permitting the variation or adjustment of the force exerted by the spring 55 on the support plate 51 and therefore on the first cover plate 19 and the linking rod 18. The force of the spring 55 is exerted in a direction opposite to that in which the force of the spring 29 is exerted. Therefore, the spring 55 exerts a force in the direction of the effective pressure variation.

A spring 58 is coaxially positioned in the second expansion container 48. The upper end of the spring 58 abuts the undersurface of the first cover plate 19 and the lower end of said spring abuts the upper surface of the cover plate 54. The spring 58 is a compression spring and exerts a force downward from the first cover plate 19, so that it maintains the second expansion container 48 in an expanded condition, that is, the spring 58 maintains and urges the first cover plate 19 and the cover plate 54 in spaced relation with each other.

A plurality of bores 59 are formed through the first cover plate 19, so that the first expansion container 48 opens into the first elastic container 14. A plurality of bores 61 are formed through the second cover plate 21, so that the second expansion container 49 opens into the second elastic container 15. The second expansion container 49 differs from the first expansion container 48 and from the first and second elastic containers 14 and 15 in that its elasticity or resistance is as small as possible, and is considerably smaller than the elasticity and resistance of said first expansion container and said first and second elastic containers.

The first expansion container 48, the first elastic container 14, the third pressure chamber 17, the second elastic container 15 and the second expansion container 49 are filled with liquid such as, for example, aforementioned. The volume of liquid in the first expansion container 48 is variable under variation in pressure in the first pressure chamber.

The first aperture 12 forms part of a liquid passage which is formed through the first partition 4. The liquid passage includes a channel, conduit, duct or the like 62 formed in the first partition 4 and a second channel, conduit, duct or the like 63. The liquid passage 12, 62, 63 thus extends from the first elastic container 14, into which the first aperture 12 opens, to the third pressure chamber 17, into which the duct 63 opens. The liquid passage 12, 62, 63 thus provides a passage for directing liquid from the first elastic container 14 to the second elastic container 15 via the third pressure chamber 17. The liquid passage 12, 62, 63 also functions to throttle the flow of liquid between the first and second elastic containers 14 and 15, due to its cross-sectional areas.

A flow control device 64 is positioned in the duct 62 of the liquid passage 12, 62, 63 at the opening of the duct 63 and functions to vary the cross-sectional area of the duct 63, thereby varying the flow through said duct 63. The flow control device may comprise, for example, a threaded member which is threadedly engaged with an internally threaded bore formed in the housing and expanding beyond said housing to enable manual control thereof. The annular cross-sectional area of the bore 16 which is not occupied by the linking rod 18 is small compared to the cross-sectional area of the conduit 63.

In a preferred embodiment of the apparatus of the present invention, the first and second elastic containers 14 and 15, respectively, the first and second expansion containers 48 and 49, respectively, and the linking rod 18 are coaxially positioned within the housing sections 1, 2 and 3. The first and second expansion containers 48 and 49 need not be positioned as shown in the figure, however, but may be positioned otherwise, for example, between the first elastic container 14 and the first partition 4 and between the second elastic container 15 and the second partition 8, respectively. In such case, suitable conduit means are provided between the corresponding elastic and expansion containers and between the components of the fluid system which are filled with liquid. Furthermore, the electrochemical power compensating apparatus need not be positioned in and affixed to the cylindrical container 7, but may be positioned outside the housing sections. In such case, a mechanical coupling which couples the linking rod 18 to the electromechanical power compensating apparatus then extends through a suitable pressure seal or seals provided in the housing section 3. Suitable magnetic couplings may be utilized in such case, too.

A bore 65 is formed through the support plate 51 in alignment with a threaded bore formed in the cover plate 54. A threaded member such as, for example, a small bolt, may be seated on the bore 65 and extend into the threaded bore in the cover plate 54 in coupling engagement with said threaded bore. This permits the adjustment in position of the cover plate 54 relative to the support plate 51.

Although not specifically shown in the figure, the electrically conductive leads 43, 44 and the like pass through a pressure seal in the first partition 4 in a pressure-tight manner in passing from outside the housing sections 1, 2, 3 to inside the cylindrical container 7.

The apparatus of the present invention functions in the following manner.

If it is assumed that the pressure in the first pressure chamber 5 increases suddenly in magnitude, then it must be assumed that prior to the time of such increase the pressure within the first elastic container 14 corresponds to the pressure within the second pressure chamber 9. Thus, upon an increase in pressure in the first pressure chamber 5, due to a variation in flow of pressure of the medium in the pipe (not shown in the figure), the increase in pressure compresses the first expansion container 48 in an upward direction against the force exerted by the spring 58. The compression of the first expansion container 48 by the increased pressure in the first pressure chamber 5 continues for a period of time until the pressure inside said first expansion container, in addition to the force exerted by the spring 58 therein, reaches a balance condition with the pressure in the first pressure chamber. The balance condition may not be perfect, but may involve a small difference or error. Thus, the pressure increase in the first pressure chamber 5 produces a corresponding increase in pressure in the first expansion container 48 and in the first elastic container 14.

The increase in pressure in the first expansion container 48 and in the first elastic container 14 produces an upward movement of the first cover plate 19, which moves the linking rod 18 upward in an axial direction. The increase in pressure in the first expansion container 48 and in the first elastic container 14 also produces a flow of liquid from said first expansion container and said first elastic container through the liquid passage 12, 62, 63 into the third pressure chamber 17. In passing through the liquid passage 12, 62, 63, the liquid is throttled. The liquid, after passing through the duct 63 into the third pressure chamber 17, flows into the second elastic container 15 via the second aperture 13 and hence into the second expansion container 49 via the cores 61. Due to the flow of liquid from the first expansion container and first elastic container 48 and 14, respectively, into the second elastic container and expansion container 15 and 49, respectively, the pressure within said first expansion container and said first elastic container decreases. This decrease of pressure is gradual, since the flow of liquid is throttled and is therefore gradual.

As the pressure within the first expansion and elastic containers 48 and 14, respectively, gradually decreases, the linking rod 18 gradually moves axially upward to a very small extend. The upward motion of the rod 18 follows an exponential function which increases from zero. The time constant of the exponential increase in motion, which is proportional to the exponential increase in pressure, may be adjusted by variation of the cross-sectional area of the duct 63 of the liquid passage 12, 62, 63. The variation of the cross-sectional area of the duct 63 is readily and facilely accomplished by the flow control device 64. The time constant of the exponential function may thus be brought to a period of between one and twenty seconds, with facility and rapidity.

When the linking rod 18 moves upward to a point at which the collar 24 thereof abuts the projection extending from the end of the first lever 23, and continues to move upward, said first lever is moved in a counterclockwise direction about its pivot point. The counterclockwise movement of the first lever 23 causes counterclockwise movement of the second lever 25 via the first coupling member 26, and the counterclockwise movement of said second lever causes counterclockwise movement of the third lever 27 via the second coupling member 28. The counterclockwise movement of the third lever 27 causes unbalance of the bridge circuit 34 by movement of the dampening arm 31, so that the unbalance or error current supplied to the coils 38 and 39 causes an upward motion of the coil 39. The upward motion of the coil 39 produces a clockwise rotation of the third lever 27 which is counter to the counterclockwise rotation of said third lever produced by the pressure increase and which is proportional to the square of the current through the coils 38 and 39. The third lever 27 thus functions as a measuring element or component of the electromechanical power compensating apparatus. The meter 41 which may comprise, for example, an ammeter which if suitably calibrated, indicates the magnitude of the unbalance or error current and thus provides an indication of the difference in pressure of the medium or liquid in the pipe (not shown in the figure).

The apparatus of the present invention provides an indication of pressure difference of the medium or liquid in the pipe (not shown in the figure), which indication is not influenced by pulsations of such pressure. Furthermore, the indication is provided although there is no actual flow of liquid through the pipe, but there is merely an oscillation or pulsation of liquid in said pipe.

By adjustment of the tension of the spring 55, all the parts of the electrical compensator are set to zero, so that, when the pressures in the first and second pressure chambers 5 and 9 are equal, no current flows in the output of the amplifier 36. If the pressure in the first pressure chamber 5 increases, a force corresponding to the difference between the two pressure chambers is exerted upon the linking rod 18. This force is transmitted by the lever system 23, 25 and 27 and causes a displacement of the damping arm 31 and a corresponding variation in the resistance of the inductive resistors 32 and 33. At the output of the electrical bridge circuit 34, a corresponding error signal is then produced, which in turn causes a corresponding current to flow in the output circuit of the amplifier 36. The error current flows through the coils 38 and 39 of the electromagnet, which responds by producing an opposing force transmitted to the connecting rod via the lever system 23, 25 and 27 and compensating for the force to be measured. The displacements of the connecting rod 18 which occur during the operation are very small, and amount to only a few hundredths of a millimeter, so that the elastic limits of the bellows are not exceeded.

While the invention has been described by means of a specific example and in a specific embodiment, I do not wish to be limited thereto, for obvious modifications will occur to those skilled in the art without departing from the spirit and scope of the invention.

I claim:

1. Apparatus for measuring a difference in pressure, comprising
   a first pressure chamber having conduit means for coupling to a pipe conducting a medium whose difference in pressure is to be measured;
   a second pressure chamber having conduit means for coupling to said pipe;
   partition means interposed between and separating said first and second pressure chambers, said partition means having an aperture formed therethrough;
   a first expandable elastic container in said first pressure chamber sealing said first pressure chamber at the aperture through said partition means;
   a second expandable elastic container in said second pressure chamber sealing said second pressure chamber at the aperture through said partition means;
   a linking rod affixed to each of and rigidly coupling said first and second elastic containers and extending from one of said elastic containers to the other through the aperture through said partition means;
   electromechanical power compensating means for providing an electrical signal corresponding to a difference in pressure between said first and second pressure chambers;

coupling means mechanically coupling said linking rod to said electromechanical power compensating means;

a first expandable elastic expansion container affixed to and opening into said first elastic container;

a second expandable elastic expansion container affixed to and opening into said second elastic container, each of said first and second expansion containers and each of said first and second elastic containers being filled with liquid, the volume of liquid in said first expansion container being variable under variation in pressure in said first pressure chamber; and liquid passage means formed through said partition means and extending from and opening into each of said first and second elastic containers for directing the passage of liquid from said first elastic container to said second elastic container and for throttling the flow of liquid between said first and second elastic containers.

2. Apparatus as claimed in claim 1, further comprising a third pressure chamber, and wherein said partition means comprises a first partition having a first aperture formed therethrough and a second partition spaced from said first partition and having a second aperture formed therethrough, said first partition separating said first and third pressure chambers and said first elastic container sealing said first pressure chamber at said first aperture, and said second partition separating said second and third pressure chambers and said second elastic container sealing said second pressure chamber at said second aperture.

3. Apparatus as claimed in claim 2, wherein said liquid passage means is formed through said first partition and extends from and opens into each of said first elastic container and said third pressure chamber and directs the passage of liquid from said first elastic container to said second elastic container via said third pressure chamber, said liquid passage means throttling the flow of liquid between said first elastic container and said third pressure chamber.

4. Apparatus as claimed in claim 3, further comprising flow control means in said liquid passage means for varying the cross-sectional area of said liquid passage means, wherein said first, second and third pressure chambers are axially aligned and said first and second elastic containers and first and second expansion containers are coaxially positioned with said chambers and with each other, said linking rod extending coaxially through said third pressure chamber, and wherein said flow control means has an extending portion for manual control thereof.

5. Apparatus as claimed in claim 4, wherein said third pressure chamber is filled with liquid.

6. Apparatus as claimed in claim 2, wherein said first, second and third pressure chambers are axially aligned and said first and second elastic containers and first and second expansion containers are coaxially positioned with said chambers and with each other, said linking rod extending coaxially through said third pressure chamber.

7. Apparatus as claimed in claim 2, further comprising flow control means in said liquid passage means for varying the cross-sectional area of said liquid passage means, and wherein said first, second and third pressure chambers are axially aligned and said first and second elastic containers and first and second expansion containers are coaxially positioned with said chambers and with each other, said linking rod extending coaxially through said third pressure chamber.

8. Apparatus as claimed in claim 1, further comprising flow control means in said liquid passage means for varying the cross-sectional area of said liquid passage means.

9. Apparatus as claimed in claim 8, wherein said flow control means has an extending portion for manual control thereof.

10. Apparatus as claimed in claim 1, wherein said first and second pressure chambers are axially aligned and said first and second elastic containers and first and second expansion containers are coaxially positioned with said chambers and with each other.

References Cited

UNITED STATES PATENTS

| 3,196,663 | 7/1965 | Ziegler et al. | 73—407 XR |
| 3,225,600 | 12/1965 | Ziegler | 73—407 |

LOUIS R. PRINCE, Primary Examiner.

DONALD O. WOODIEL, Assistant Examiner

U.S. Cl. X.R.

73—407